Feb. 13, 1951 W. H. GRANT 2,541,869
APPARATUS FOR MAKING BELLOWS
Filed Dec. 13, 1944 6 Sheets-Sheet 1

INVENTOR.
WILLIAM H. GRANT,
BY
Justin W. Macklin

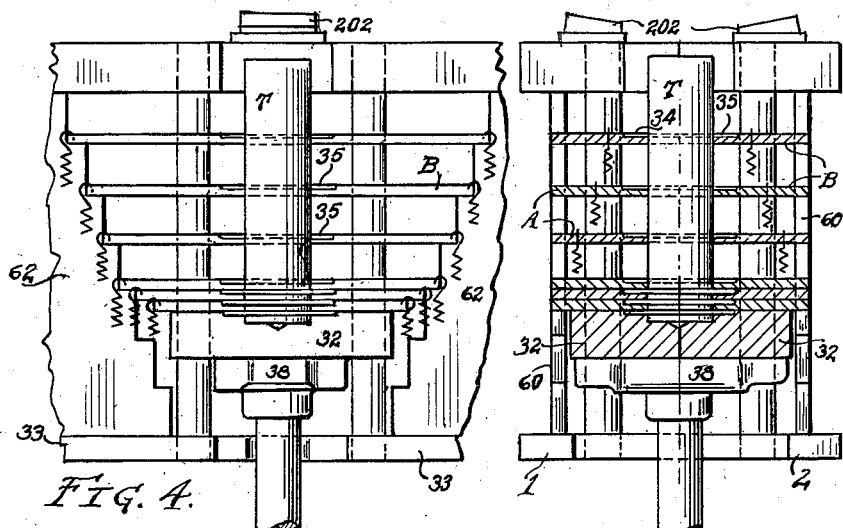
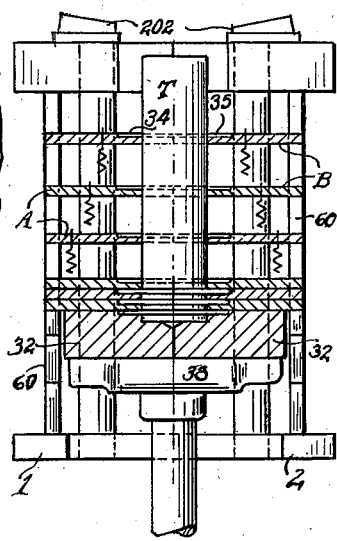
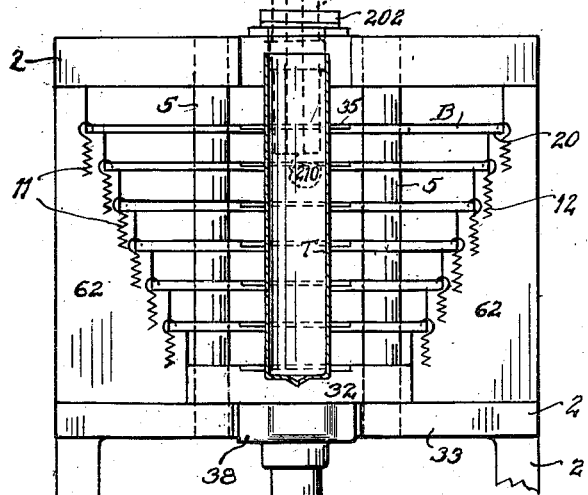
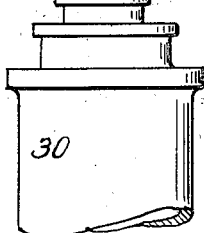
INVENTOR.
WILLIAM H. GRANT,
BY Justin E Macklin
ATT'Y

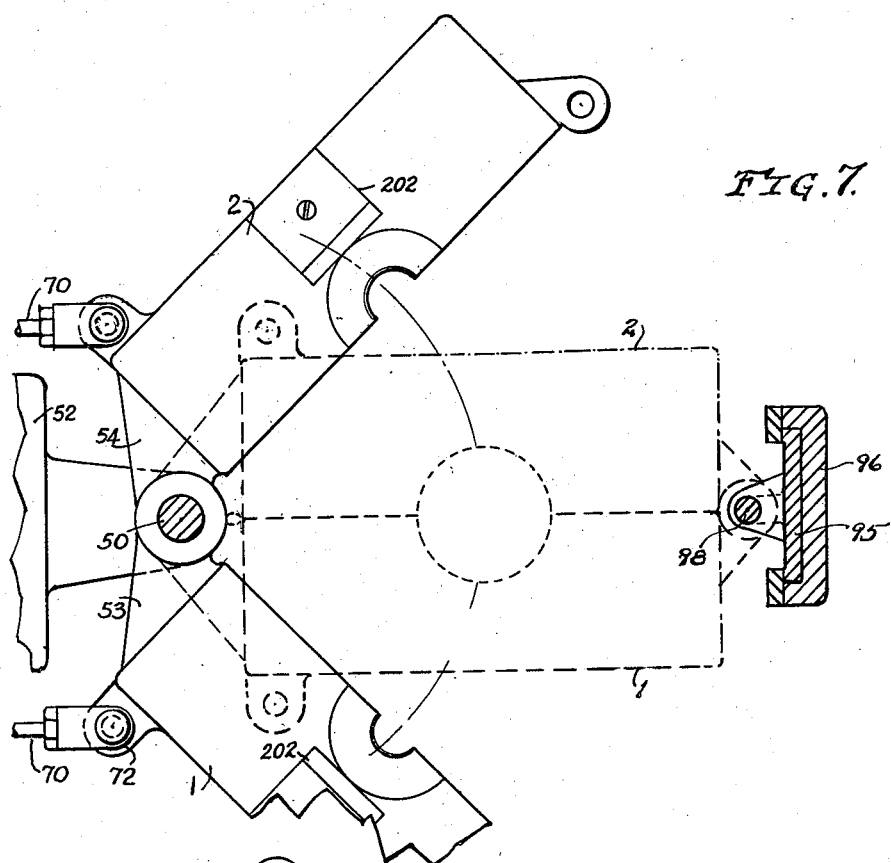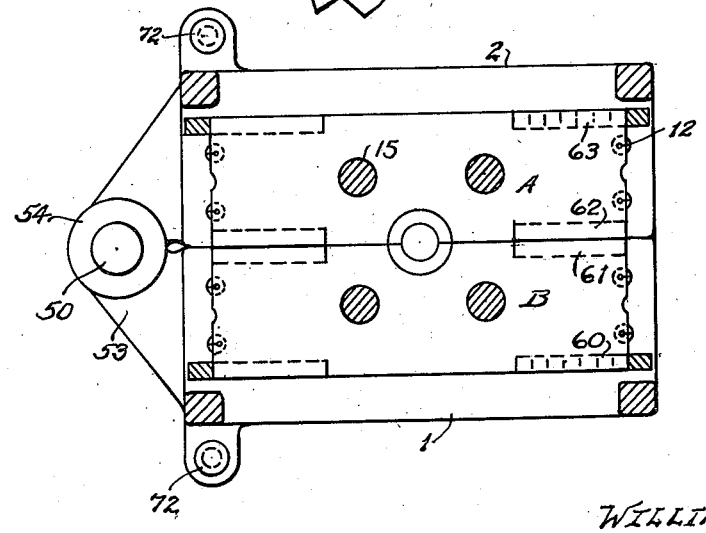

Feb. 13, 1951 W. H. GRANT 2,541,869
APPARATUS FOR MAKING BELLOWS
Filed Dec. 13, 1944 6 Sheets-Sheet 4

INVENTOR.
WILLIAM H GRANT,
BY
Justin W Macklin
ATT'Y

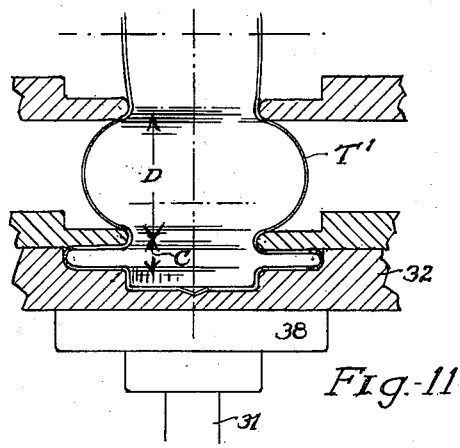
Fig.-11
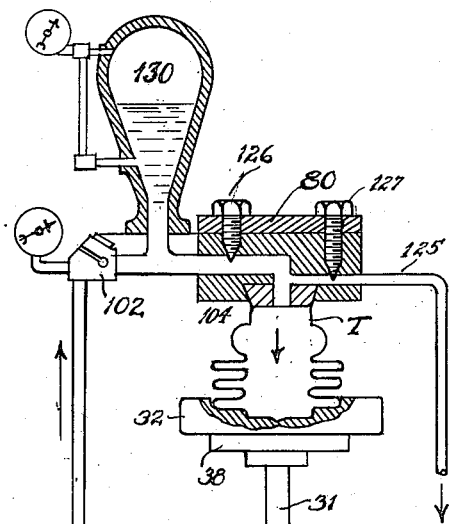
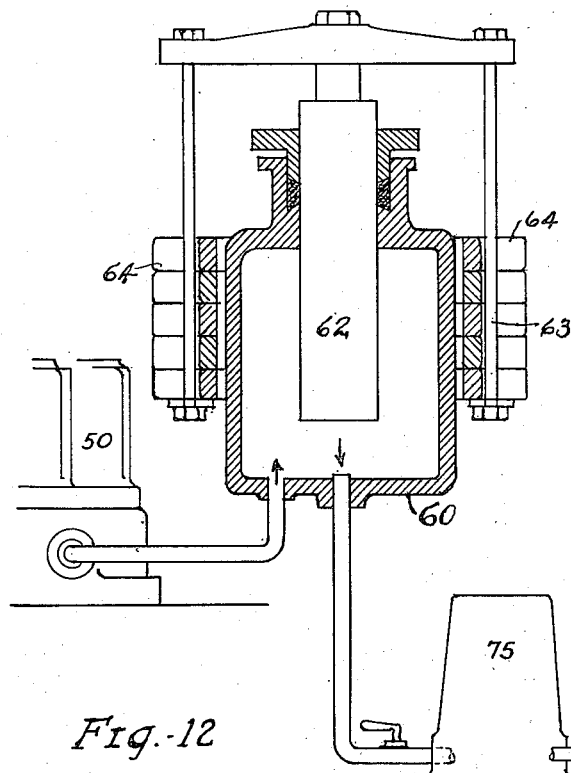
Fig.-12
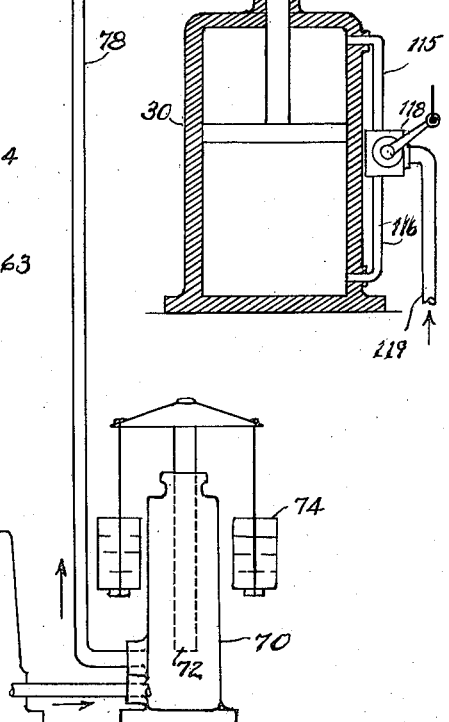
INVENTOR.
WILLIAM H. GRANT,
BY
Justin L. Macklin
ATT'Y

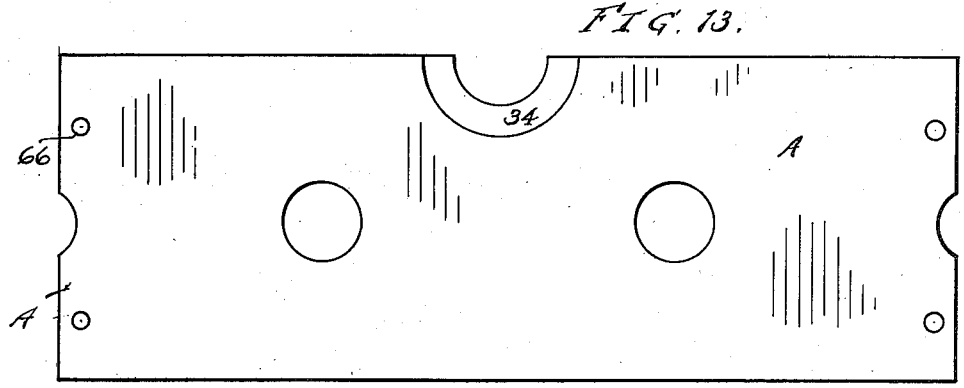
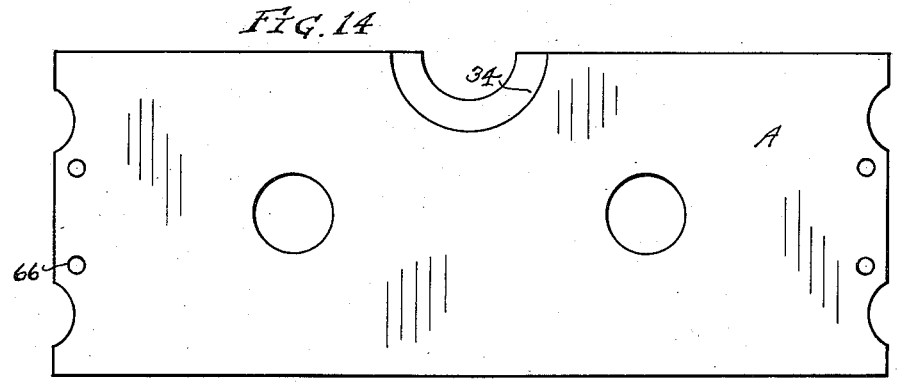
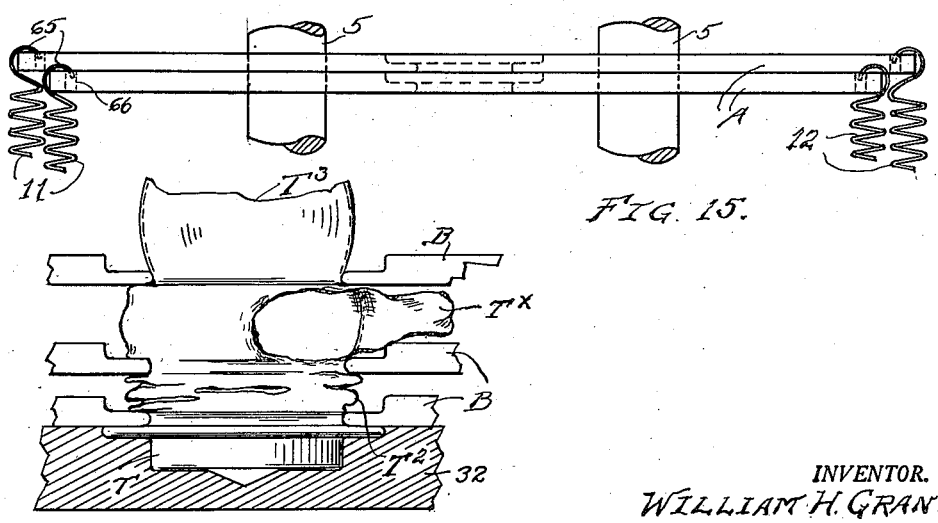

Patented Feb. 13, 1951

2,541,869

UNITED STATES PATENT OFFICE 2,541,869

APPARATUS FOR MAKING BELLOWS

William H. Grant, Cleveland, Ohio, assignor of thirty-five per cent to Justin W. Macklin Application December 13, 1944, Serial No. 568,038

11 Claims. (Cl. 153—73)

This invention relates to a new and improved apparatus for making expansible and collapsible hollow walls—usually taking the form of a metallic bellows formed from a tube, and comprising a plurality of coaxial convolutions or folds.

More particularly, the invention is concerned with forming expanded parallel folds in a (closed) tube wall of thin high tensile resilient material.

Large numbers of such corrugated tube bellows have been manufactured for many years of a wide variety of sizes, responsive to internal pressure when and for use in numerous applications. They are usually formed of very thin brass tubing, and an illustrative field is that of thermo-responsive actuating devices.

Difficulties heretofore encountered have been to attain maximum extension of the walls to form the individual corrugations with uniformity while avoiding danger of splitting or bursting or distortion, excessive strain or uneven flow of the metal on the material of the wall during formation.

A series of separable die rings mounted to move axially while embracing the tube and during application of internal fluid pressure are used in well-known processes for the manufacture of millions of such articles.

Modern demands for higher production, greater sensitivity, extreme minimum percentage of rejected articles; war-time strategic demands imposing extreme economy of copper, brass and like materials, and many other factors, constitute an array of exacting requirements which have been difficult to meet by existing processes and apparatus.

An essential object, therefore, is to provide a simple, efficient, cheaply manufactured apparatus capable of rapid operation and precise uniformity in production.

A more specific object is to provide for controlling the internal expanding pressure to compensate for changing volumetric-content within the tube as one or more convolutions are successively or serially formed.

A still further object is to assure maintaining parallel positions of the separable die rings during the forming of the corrugations, and by mechanical construction of the dies and means for operating them such that they are extremely simple and cheap to manufacture and easily replaced when worn or damaged.

Other objects and advantages will become apparent in the following description.

A means for quickly securing and sealing the upper open end of the tube blank, prior to the corrugating operation automatically responsive to the closing movement of the die carrying means, briefly herein mentioned, will be made the subject matter of a new application.

An embodiment of my invention by which the foregoing objects are attained is illustrated in the accompanying drawings to which the following description relates and in which other objects and advantages will become apparent.

Describing my invention by reference to the accompanying drawings illustrating a preferred embodiment thereof:

Fig. 4 is an elevational view on a smaller scale showing the dies on one side of the tube.

Fig. 5 is a section through the pairs of die rings in the same position as shown on Fig. 4.

Fig. 6 illustrates the blank in position constituting a fragmentary section through the die carriers, and showing the operating plunger.

Fig. 7 is a plan view of the die carrier in open position—the closed position being indicated in broken lines.

Fig. 8 is a horizontal section above the topmost pair of die plates.

Fig. 11 is a sectional view illustrating the intermediate condition of a corrugation being folded.

Fig. 12 is a diagram showing the hydraulic operating system.

Fig. 13 is an enlarged detail of one element of the divided die ring plate.

Fig. 14 is a similar detail of one element of the next adjacent die plate.

Fig. 15 is an edge elevation showing the adjacent die elements and spring connection.

Fig. 16 is a diagrammatic detail illustrating one of the conditions resulting from failure due to bursting of the tube blank.

Figure 1:
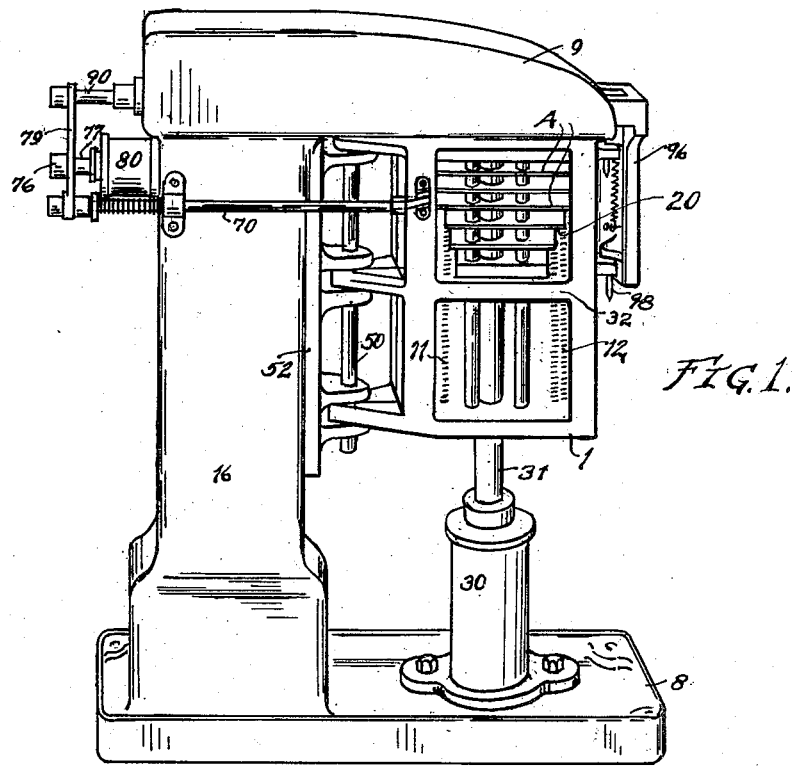
Fig. 1 shows in side elevation an illustrative form of my machine.

In present practice of manufacture of corrugated metallic tube bellows, the regulation of the internal hydraulic or hydrostatic pressure during forming the convolutions constitutes a prime factor and a major problem.

If the closing be too rapid, variations in pressure consequent upon the changes in shape and content of the tube as the collapsing or folding plunger operates impose too great a strain on the wall of the tube—causing failure.

Various irregular effects occur upon too great a pressure variation even when the wall of the tube remains intact. These failures result in a high percentage of imperfect bellows in the course of production. Such failures may result when using processes such as illustrated in prior patents to Hollerith et al., No. 349,718, patents to Bezzenberger, No. 1,506,966 and No. 1,698,210, as well as in my own prior patents, No. 2,028,150 and No. 2,028,151, particularly where it is attempted to speed up the forming operations.

It will be noted that in those patents the die structure and operating mechanisms are complex and expensive, and are relatively heavy and cumbersome.

In carrying out the present invention I prefer to use die rings formed from flat plate or strip stock for reasons and advantages herein set forth. These die members are designated A and B, and are shown as guided on vertical rods 5 in the die carrier frames 1 and 2, which, in turn are hinged to the upright housing 16 of the machine frame.

The machine frame and general structure may take any form and size suitable for the purposes as may be governed by the size of work and other factory conditions.

As shown, the upright portion 16 rises from suitable base 8 and carries an overhanging head portion 9 extending beyond the die carrier frames and carrying locking and closing mechanism for the frames, as will be later described.

The flat die blanks A and B may be made from tool steel flat bar stock, may be readily replaced and are inexpensive. Much time may be saved by carrying reserve die parts at hand for replacement in any machine or any group of machines operating on similar blanks.

Likewise, their simplicity permits easy interchangeability, and quick removal and replacement.

To assure the horizontal, parallel alignment preparatory to receiving the tube blank T, pairs of springs, 11 and 12 may be attached to each end of each half die ring A and B. These springs cause them to seat on shoulder members 20 which are rigid in the die frames 1 and 2.

In the operation of such an apparatus, hydraulic pressure may be supplied to the inside of the tube blank by any suitable pumping and pressure controlling means. However, the present invention requires a minimum of equipment, and accomplishes the control during the forming operations within very narrow ranges of variations of pressure.

The pressures used may range from three to four hundred pounds more or less. For example, in the formation of a one inch diameter tube having a wall thickness of .0055 of an inch, the preferred pressure is approximately 350 pounds per square inch.

Liquid, such as water, may be supplied from a pumping means 50 to an accumulator 60 in Fig. 12, in turn, connected with a secondary smaller more responsive accumulator 70, through an intermediate equalizer 75.

The weight of the accumulator and body of water constitutes considerable mass. The ram 62 and its weights 64, as well as the ram 72 and smaller weights 74 are responsive to variations and will maintain even pressure, but only if the variations of escape or drainage through the lead pipe 78 valve mechanism 80 to the tube blank T allow time to overcome inertia and momentum of quickly changing intermittent flow to the tube blank T.

As each corrugation is formed, the volume of water in the tube in any one space between dies increases when the tube is ballooned, as appears in Fig. 11. At that time, as high as twice as much water is required between the adjacent pairs of die rings.

The continued closing movement of the dies to the closed position at a center to center distance C, Fig. 11, displaces most of this water. All this occurs—first increasing, then reducing the volume from the increased amount to the final least amount—in approximately one-fiftieth of a second, for example:

As a specific illustration, assuming one inch center to center spacing of the dies when open and about one-fourth of that spacing when closed, now, as the pressure is applied to the tube and the upward movement of a die begins, the wall of the tube is expanded about as shown at T—1 in Fig. 11. At this instant, about three-fourths to four-fifths of a cubic inch of additional water volume stands between these adjacent dies. Thus, in only a part of a fiftieth of a second of time the additional water must flow into this space in nearly twice the volume of the water occupying this fold or section an instant before. As the expanding of the fold continues, the dies now approach the closed position—and still within this same one-fiftieth second—the enlarged volume of water must be displaced and reduced to less than about one-fourth of a cubic inch. The resulting abrupt pounding and surge causes violent pressure changes in the tube blank.

The inertia of the accumulator weights and column of water in the pipe leading to the blank cannot be overcome by gravity quickly enough to permit response to such rapid operation, while maintaining anything approximating even fluid pressure within the bellows blank. Many failures and rejects result.

An illustration of such a failure in actual practice is that of Fig. 16, where a portion of the wall Tx extending from one die member B to another is torn and blown outwardly. The resulting pressure release causes an irregular collapsing of a number of folds between pairs of dies which are being brought together. For example, such a collapsed effect appears at T2, while at the same moment the section at T3 is arrested in its expansion and is subject to collapse as the dies continue to close.

An important feature of this invention largely overcomes the problem of rapid violent pressure changes. By the use of an air chamber 100 connected between a check valve 102 and the blank T, air may be compressed in the chamber 100 by the accumulators 70 and 60. The air pressure in this chamber needs only to move a few ounces of water to compensate for the changes in volume in the bellows blank as it is formed. This has the effect of a relatively highly sensitive pressure equalizer. Being close to the tube blank, it provides extremely quick acting response to changes of volume of water in the blank. Pressures within the tube during the forming may be kept extremely even and within narrow ranges above and below the desired 350 pounds—or other predetermined pressures.

The tube blank may be sealed at the top and bottom, as it is placed in operating position relatively moving clamping wedge blocks act to grip the wall of the tube between a tapered block and coacting complementary surfaces, as shown in my prior patents above named.

A guide tube, indicated in broken lines in Fig. 6 at 210 may project downwardly a distance equal to the length of the collapsed corrugated portion for holding the tube centrally while the dies are swung open to release the bellows.

An alternative form of such axial guide holding means (not shown) may be allowed to extend approximately the full length of the unformed blank and project through the lower open end of the tube and into a dead end drill hole or space in the plunger 30.

The shoulder members 20 are preferably arranged as a series of steps and the die members may move upwardly until they are all brought together, and upon being released the springs 11 and 12 return each die member to contact with its spacing and locating shoulders.

Figure 3:
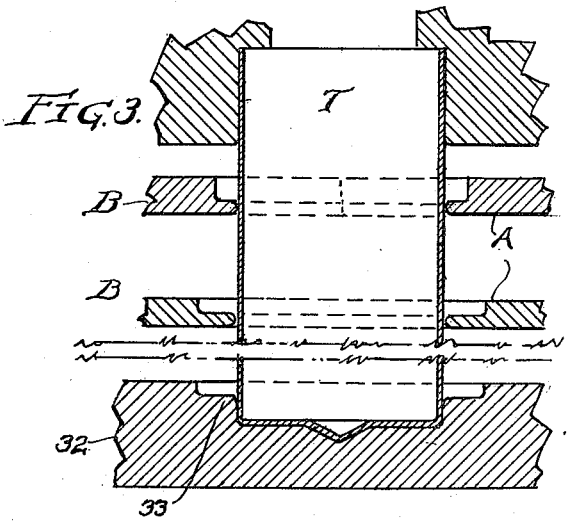
Fig. 3 is an enlarged fragmentary section showing the blank in the dies.

Below the divided die members is a plate 32 having a cavity to receive the end of the blank T as shown in Fig. 3. This cavity may have an annular recess 33 corresponding to the recesses 34 and 35 in the divided die rings. As shown, the folds or convolutions are expanded and formed in these recesses as the dies are brought together. By means such as described in my prior patents, above designated, hydraulic pressure is created within the tube blank T, and by any suitable means the plate 32 and dies may be forced upwardly during the formation.

Improvements are hereinafter described for the control of the supplying of the fluid under pressure and maintaining the pressure substantially constant. Any form of piston and cylinder may forcibly move the plate 32 upwardly and bring the forming die members together. I have shown a cylinder 30, piston 31 and plunger provided with a supporting head 38 engaging a die plate 32.

The lower-most die members are moved much further than the upper die rings. Accordingly, the holding springs are preferably longer and have sufficient turns to permit seating with substantially the same pull-down applied force as is applied to the shorter traveling upper dies which, likewise, need relatively only shorter springs.

In each case, the springs attached to the plates for each pair of dies are adjustable and selected for length and strength to offer the desired resistance for most effective seating and holding.

Figure 9:
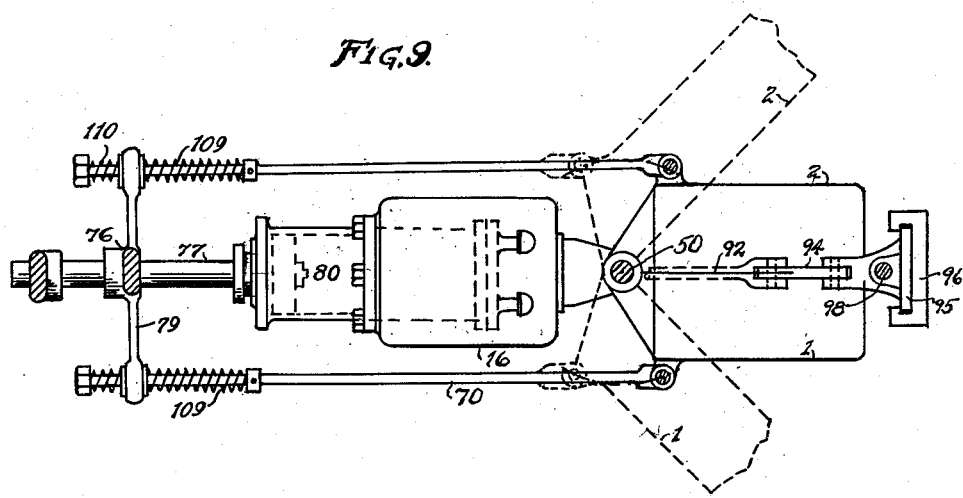
Fig. 9 is a horizontal sectional plan of the means for opening and closing the die-carrying frames.
Figure 10:
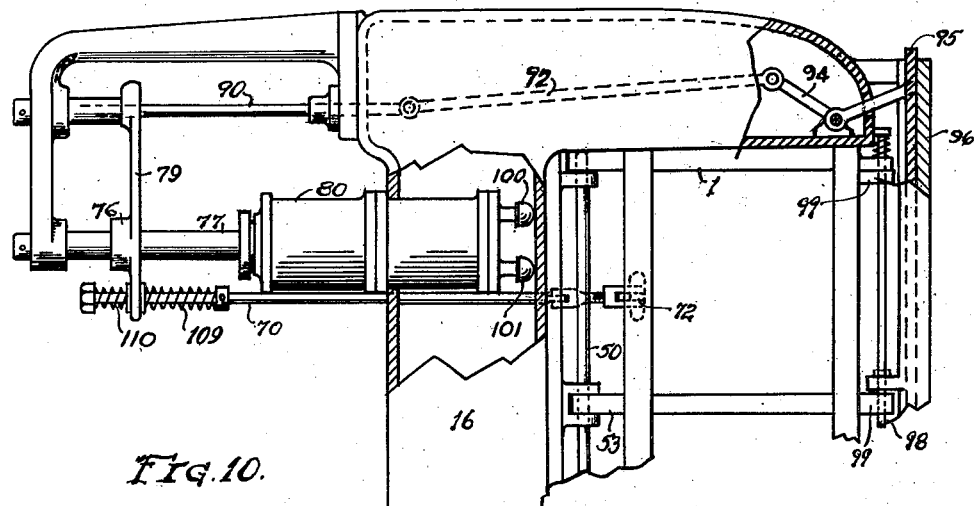
Fig. 10 is a side elevation, partly in section, showing the same means and connections to the die carrier frames.

To open and close the die carriers, swinging them from the positions shown in solid to broken lines in Fig. 7, I may provide suitable adjustable links 70 pivoted as at 72 to the frame members 1 and 2 and extending horizontally past the upright frame of the machine and shown as attached to a movable bracket 79 which is intermediately connected at 76 with the rod 77 of a piston for the cylinder 80 (Figs. 1, 9 and 10).

The same bracket has an upward extension shown as connected by a rod 90 through the head of the machine to a rock-lever 94 within the housing, one arm of which engages a vertically mounted slide 95 carried in a guideway 96, secured to the overhanging end of the machine head. On the slide may be carried separated locking pins 98 adapted to engage receiving eye projections 99 on the forward portion of the die carrying frames.

Thus, as the die carrier frame members 1 and 2 are brought together causing the dies to engage a fresh tube blank, the two parts of the die support become rigidly held as one solid frame.

Likewise, upon the opening movement of the frame which may be accomplished by admitting air through suitable connections as at 100 and 101 to the cylinder 80, the locking pins and slide are raised through the linkage 94, 92 and 90. Further movement acting through cushioning springs, shown at 110, swings the die carrying frame open by the pulling action on the links 70 and their pivots 72.

The supply of expanding pressure water through the pipe 78 is led into the tube T through an inlet at 104, and as the described expanding and collapsing during forming occur, the check valve 102 blocks return to the pipe 78, and the exhaust under control of a regulating valve may be through a pipe indicated at 125.

At 126 and 127 are diagrammatically indicated control valves for the passage leading to and from the tube blank.

The air chamber 130 being connected closely to the tube responds to its variation in volume however rapid, while the adjusting compensating surge or flow may occur in a very short water column, of minimum weight. For example, only a few ounces of water oscillates as the convolutions are formed. This air chamber provides for cushioning this surge with extremely slight pressure change, and varies with the formation of each or several convolutions.

The closer the pressure responsive chamber is to the inlet of the tube blank, the less the danger from surging pounding momentum of the water column leading into the tube, with resulting danger to the walls of the tube being formed. This volume change responsive control, while preferably in the form of an air chamber, may for some purposes be embodied in other forms of means for maintaining pressure and permitting volume variation. For example, a light piston in a cylinder connected to the inlet for the tube blank may be spring pressed and be moved by the rapid volume variation just as the water vibrates, as it were, in the air chamber.

Figure 2:
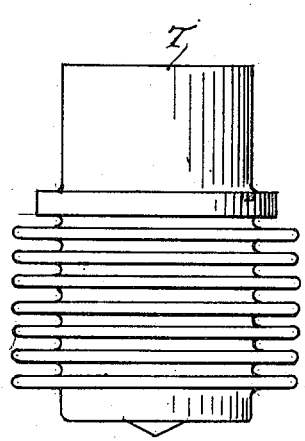
Fig. 2 is an enlarged elevation of a bellows removed after the corrugating operation.

Likewise, this volume which may be neutralized by maintaining even pressure by the use of a bellows similar to that formed by this invention. For example, the bellows of Fig. 2 made of sufficient strength could be mounted so that its interior communicates with the interior of a tube being formed, and could be readily utilized to allow volume variation by applying suitable adjustable spring pressure at its closed end.

The regulation of the water to and from the tube is here only briefly referred to and diagrammatically illustrated. For more complete description of the valve controlling means, indicated at 80 in Fig. 12, reference may be had to my prior patents above designated.

Securing the upper end of the tube blank to seal it against loss of the liquid under pressure, as stated, may be accomplished with a movement of manually or power operated devices. The form of securing means depends upon the shape of the upper end of the tube which may be straight, flared or flanged, as appears in my prior patents.

The sealing may be effected by the closing movement of the die carriers acting to wedge a gripping ring into tight engagement, as stated, embodiments of such mechanism comprise the subject matter of a separate application.

An advantage of the opening and closing arrangement for the die carrying frames is the rapidity and convenience of removal of the finished bellows and the insertion of a fresh blank.

A further advantage is that the die carrier frames moving toward and away from the blank holder may act simultaneously with the die closing to effect a gripping engagement sealing the upper end of the blank. In my prior patent structures I have shown, as in Figs. 13 to 15 in Patent No. 2,028,151, a flange formed at the upper end of the blank and arranged to be gripped by the action of a nut. I had also found that a split ring having a tapered surface could be effectively tightened upon the tube blank by an upward movement of a ring member having the same action as the nut 25 for wedging and closing the ring 36 in Fig. 5 of that patent to grip the open end of the blank.

Instead of manually operating a gripping nut or ring, a sliding sleeve or ring, like that shown at 269, and in my prior patent at 36, may act on a split ring wedging it upwardly into its tapered seat.

A ring such as shown at 25 in Fig. 5 of my prior patent instead of being manually threaded upwardly may be moved to contract the wedge clamping ring by wedges mounted on the upper part of the frame of the die carrier member 1 and 2. Such wedges are indicated diagrammatically at 292 in Figs. 4 to 6. These may engage projections or wings on a ring such as 25 in the prior patent, having sloping surfaces whereby the closing movement of the die carrier frames effects a raising movement of this ring and the clamping ring to cause it in turn to tightly embrace the upper end of the blank T.

The subject matter of this gripping and closing action is presented in a companion application for Patent Serial Number 691,216, filed by me on the 17th day of August, 1946, now Patent No. 2,495,059.

One of the modifications of this arrangement is that of a pivotally connected pair of half ring yoke members, provided with sloping surfaces embracing complementary wedging surfaces on a fixed and movable flange. One flange being on the movable ring is slid upwardly to compress the wedge ring as the two parts are engaged by resilient blocks carried in suitable brackets on the top members 33 of the frame carriers 1 and 2.

Having thus described my invention what I claim is:

1. An apparatus of the character described, the combination of means for supplying liquid under pressure to a tube blank, a pair of series of separable tube embracing corrugation forming die members each comprising flat plate-like elements having a recess extending around one-half of the tube, die carrying frames for said die members arranged to be moved to bring the die elements of said pairs into and away from embracing position and having guides extending through the elements of each series of the die members and fixed spacing shoulders against which the individual die members are seated for positioning them in parallel relation, and means for collapsing the tube axially within the dies, said guides serving to hold the dies in forming position during collapsing.

2. An apparatus for corrugating metal tubes comprising in combination tube holding means and means for supplying liquid under pressure to the tube, corrugation forming die members comprising pairs of plates each having a recess adapted to embrace one-half of the tube, frame members having fixed spacing shoulders and means normally holding the die members against said shoulders, guide members slidably engaging the dies, means for moving the tube holding members together at the same time moving the die members together, said frame members and guide members being separable to permit removal of the corrugated tube, and means for locking the frame members together embracing the tube during formation, said guide members resisting separation of the plates during formation.

3. A tube bellows forming mechanism of the character described in claim 2 in which each die member is provided with resiliently acting means to return it to the open spaced position against said shoulders.

4. An apparatus for forming corrugations and metallic tubes comprising means for embracing both ends of the tube, and means for supplying liquid under pressure to the interior of the tube, a pair of swinging carrier frames having divided dies and guides for the die parts carried by each frame and adapted to open said dies for forming the corrugations carried in said frames and being adapted to embrace approximately one-half of the tube, longitudinally fixed spacing shoulders on the frames, resilient means connected with the die members for aligning the dies in a series of planes normal to the axis of the tube by normally holding the die members against said shoulders, means for collapsing the tube axially and for bringing the die members toward each other, means for locking the die carrier frames during the latter movement and for unlocking and swinging the carrier frames open upon completion of the forming movement and said die members being formed in the nature of relatively light plates having a thickness no greater than the spacing of the bellows convolutions.

5. An apparatus of the character described including a contractible mold comprising a plurality of tube embracing plates provided with mold surfaces, guide frames for the plates, and springs for maintaining said plates in spaced relation, each of said springs being attached at one end to one plate and having the other end connected to the guide frames, and longitudinally spaced, fixed shoulders against which the plates are drawn by said springs.

6. An apparatus of the character described including a plurality of divided plates forming a collapsible mold, springs for maintaining the plates in spaced relation, relatively fixed spaced shoulders against which the plates are drawn by the springs.

7. An apparatus of the character described, a contractible mold having a plurality of die plates, fixed shoulders for spacing the plates, and springs for drawing the plates against the shoulders.

8. In an apparatus of the character described, a contractible mold including a plurality of divided tube embracing plates, separable frame members carrying the plates and having positioning shoulders engaging the individual plate members, and spring means attached to the plates and to the frame for normally positioning the plates, and means for moving the plates together, a closed chamber having an open connection with the inside of the tube, and means for supplying liquid to the inside of the tube and chamber.

9. An apparatus of the character described, comprising a contractible mold having spaced mold parts adapted to surround a shell or tube, hydraulic means and a passage having a check valve therein for supplying fluid under pressure to the tube, means for collapsing the tube and bringing the mold parts together, and an air chamber and a passage therefrom leading to the interior of the tube permitting free movement of liquid between the chamber and tube during formation, a pressure governing escape valve connected to the interior of the tube, the air chamber and escape valve cooperating so that the pressure is maintained substantially constant during rapid successive changes of volumetric content of liquid in the tube.

10. In an apparatus of the character described, the combination of means for supplying liquid under pressure to a tube blank, a series of pairs of separable flat plate-like die ring members, each member having a recess extending around one-half of the tube, guideways parallel with the axis of the tube along which said ring members may move, and means carrying said guideways to move said pairs to open and closed positions and serving to hold the rings closed, shoulders in fixed relation to the guideways for spacing said pairs of ring members, and means for moving the ring members together.

11. In an apparatus of the character described, the combination with a means for collapsing the tube to form a bellows, of hydraulic means for creating pressure within the tube during collapsing and forming, means for controlling the escape of fluid from within the tube, a check valve adjacent to the tube and means between the check valve and the escape valve responsive to volume changes within the tube for maintaining a constant pressure therein.

WILLIAM H. GRANT.

REFERENCES CITED

The following references are of record in the file of this patent:

UNITED STATES PATENTS

| Number | Name | Date |
|---|---|---|
| 1,051,450 | Rider | Jan. 28, 1913 |
| 1,271,475 | Fitts | July 2, 1918 |
| 1,951,381 | Ward | Mar. 20, 1934 |
| 2,028,151 | Grant | Jan. 21, 1936 |
| 2,217,799 | Giesler | Oct. 15, 1940 |
| 2,273,766 | Tower, Jr. | Feb. 17, 1942 |